US005525309A

United States Patent [19]
Breuer et al.

[11] Patent Number: 5,525,309
[45] Date of Patent: *Jun. 11, 1996

[54] HONEYCOMB BODY WITH A PLURALITY OF DISKS BRACED AGAINST ONE ANOTHER

[75] Inventors: Hans-Jürgen Breuer, Overath; Rolf Brück; Helmut Swars, both of Bergisch Gladbach, all of Germany

[73] Assignee: Emitec Gesellschaft fuer Emissionstechnologie mbH, Lohmar, Germany

[ * ] Notice: The term of this shall not extend beyond the expiration date of Pat. No. 5,413,7670.

[21] Appl. No.: 353,964

[22] Filed: Dec. 12, 1994

Related U.S. Application Data

[63] Continuation of Ser. No. 101,493, filed as PCT/EP92/00191, Jan. 29, 1992., abandoned.

[30] Foreign Application Priority Data

Jan. 31, 1991 [DE] Germany .......................... 41 02 890.2
Apr. 10, 1991 [DE] Germany .......................... 41 11 712.3
Nov. 8, 1991 [DE] Germany .......................... 9113928 U

[51] Int. Cl.⁶ .................................................... F01N 3/10
[52] U.S. Cl. .......................... 422/174; 422/177; 422/180; 422/199; 422/211; 422/222; 60/300; 502/439; 502/527
[58] Field of Search .................................. 422/174, 199, 422/179, 211, 180, 222; 502/439, 527; 60/299, 300

[56] References Cited

U.S. PATENT DOCUMENTS

| | | | |
|---|---|---|---|
| 3,887,741 | 6/1975 | Dwyer | 428/188 |
| 4,425,304 | 1/1984 | Kawata et al. | 422/177 |
| 4,753,918 | 6/1988 | Cyron | 502/439 |
| 4,775,518 | 10/1988 | Abthoff et al. | 422/179 |
| 4,782,661 | 11/1988 | Motley et al. | 422/179 |
| 4,822,766 | 4/1989 | Cyron et al. | 502/439 |
| 4,832,998 | 5/1989 | Cyron | 428/116 |
| 4,969,265 | 11/1990 | Ehara | 422/180 |
| 4,976,929 | 12/1990 | Cornelism et al. | 422/174 |
| 5,105,539 | 4/1992 | Maus et al. | 29/890 |
| 5,140,813 | 8/1992 | Whittenberger | 422/174 |
| 5,146,743 | 9/1992 | Maus et al. | 422/174 |
| 5,177,961 | 1/1993 | Whittenberger | 422/174 |
| 5,229,080 | 7/1993 | Abe et al. | 422/174 |
| 5,278,125 | 1/1994 | Iida et al. | 502/527 |

FOREIGN PATENT DOCUMENTS

| | | |
|---|---|---|
| 0304776 | 3/1989 | European Pat. Off. . |
| 0245736 | 8/1989 | European Pat. Off. . |
| 0245737 | 8/1989 | European Pat. Off. . |
| 0245738 | 8/1989 | European Pat. Off. . |
| 0223058 | 10/1989 | European Pat. Off. . |
| 8900168 | 3/1989 | Germany . |
| 8914079 | 3/1990 | Germany . |
| 3903879 | 8/1990 | Germany . |
| 8910471 | 11/1989 | WIPO . |
| 8910470 | 11/1989 | WIPO . |
| 9003220 | 4/1990 | WIPO . |
| 9012951 | 11/1990 | WIPO . |
| 9101178 | 2/1991 | WIPO . |

*Primary Examiner*—Robert J. Warden
*Assistant Examiner*—Hien Tran
*Attorney, Agent, or Firm*—Herbert L. Lerner; Laurence A. Greenberg

[57] ABSTRACT

A metal honeycomb body includes at least two disks being mutually spaced apart and disposed one after the other relative to an axis. Each of the disks has a multiplicity of channels formed therein through which a fluid can flow along the axis. At least one support connects the disks to one another in the vicinity of the axis. The at least one support is tubular, bar-shaped or rod shaped.

48 Claims, 6 Drawing Sheets

HONEYCOMB BODY WITH A PLURALITY OF DISKS BRACED AGAINST ONE ANOTHER

CROSS-REFERENCE TO RELATED APPLICATION

This application is a continuation of application Ser. No. 08/101,493, filed Aug. 2, 1993, now abandoned, which is Continuation of International application Ser. No. PCT/EP92/00191, filed Jan. 29, 1992.

BACKGROUND OF THE INVENTION

Field of the Invention

The invention relates to a honeycomb body, through which a fluid can flow along an axis and through a multiplicity of channels in the honeycomb body.

Such honeycomb bodies find multiple uses as carrier bodies for catalysts that are intended for the catalytic conversion of reactable components of fluids. One significant field of application for honeycomb bodies with catalysts is catalytic scrubbing of exhaust gases from internal combustion engines, particularly engines in motor vehicles. To that end, catalytically coated honeycomb bodies are installed in the exhaust systems of the engines, and the exhaust gases produced during engine operation flow through them.

The honeycomb bodies are produced from ceramic compositions or from sheet-metal layers. In order to form a metal honeycomb body, sheet-metal layers, at least some of which are corrugated, folded or otherwise structured, are layered, stacked, spirally wounded or intertwined in some other way. Options therefor are described in European Pat. No. 0 223 058 B1, corresponding to U.S. Pat. No. 4,824,011; European Patent No. 0 245 736 B1; European Patent No. 0 245 737B1, corresponding to U.S. Pat. Nos. 4,832,998 and 4,923,109; and European Patent No. 0 245 738 B1, corresponding to U.S. Pat. Nos. 4,803,189 and 4,946,822; U.S. Pat. Nos. 4,753,981 and 4,822,766; Published International Applications WO 89/10470 A1, WO 89/10471 A1, WO 90/03220 A1, and WO 90/12951 A1; and German Published, Non-Prosecuted Application DE 39 03 879 A1, as well as German Petty Patent No. 89 08 738 U1.

Catalysts for the conversion of reactable components of a fluid flowing around them typically do not develop their catalytic effect until above certain limit temperatures which are specific to the particular catalyst and to the reaction to be catalyzed, that is so-called "light-off temperature". In the case of catalysts intended for converting pollutants in the exhaust gases of typical internal combustion engines, the light-off temperatures are generally on the order of several hundred degrees Celsius. Therefore, such a catalyst must be heated if it is to become active. In a motor vehicle exhaust system, that is done as a rule by the gas flowing through the honeycomb body coated with the catalyst, but the catalytic effect ensues only with a certain delay after the engine is put into operation. Electric preheating of the catalyst or of the honeycomb body carrying it is already known in order to eliminate or reduce that delay. Published International Applications WO 89/10470 A1, WO 89/10471 A1, WO 90/03220 A1, and WO 90/12951 A1; and German Published, Non-Prosecuted Application DE 39 03 879 A1, as well as German Petty Patent No. 89 08 738 U1, provide teaching on that point. The layers forming the metal honeycomb body are electrically interconnected in such a way that a path is formed to guide an electric current through the honeycomb body. Current supply leads are also mounted on the honeycomb body, to which an electric current source, for instance a motor vehicle battery, should be connected through suitable switchgear and lines. A honeycomb body of a typical size and structure for use in the exhaust system of a motor vehicle requires a heating capacity of from several hundred watts to more than 4 kW for heating in a sufficiently short time. Therefore, an onboard electrical network with a voltage of 12 V, as is usual in passenger cars, would have to furnish currents of up to 400 A to heat the honeycomb body. The electrical resistance of the honeycomb body must correspond to the electrical voltage available and to the heating capacity to be brought to bear. However, metal honeycomb bodies of the typical type have electrical resistances of only a few thousandths of an ohm at most. Such a honeycomb body would draw currents of up to 1000 A from an electrical voltage source with a voltage of approximately 12 V, meaning that a typical motor vehicle battery would be strained to a virtually unsupportable extent. From the prior art documents cited above, provisions are already known for increasing the electrical resistance of a honeycomb body for given geometrical dimensions. For instance, electrically heatable honeycomb bodies may be split by means of gaps and/or electrically insulating partitions between the layers in such a way that a current path having an electrical resistance of a suitable level is produced and extended through the honeycomb body. The suggestion has also already been made of using not a single honeycomb body with a catalyst coating but rather two such honeycomb bodies. An electrically heatable smaller honeycomb body precedes a larger honeycomb body that is not intended to be heated directly and both honeycomb bodies have substantially the same diameter, but the smaller honeycomb body is substantially shorter than the larger honeycomb body. Due to the dimensioning, a significantly higher electrical resistance can already be achieved in the smaller honeycomb body as compared with the larger honeycomb body. In particular, the smaller honeycomb body can be constructed in such a way that with limited strain on a voltage source, it can be brought rapidly enough to a temperature above the light-off temperature if the catalyst located on the honeycomb body. The typically exothermic catalytic reaction that ensues upon the exhaust gas flowing through the smaller honeycomb body causing heating of the exhaust gas and thus reinforces the heating of the larger honeycomb body, which in the final analysis takes on the main burden of the catalytic converter. In German Petty Patent No. 89 08 738 U1, metal plates which are intended for producing an electrically heated honeycomb body may be provided with holes, in order to increase their specific resistance and to obtain a honeycomb body with a relatively high electrical resistance. Published International Application WO 90/12951 A1 shows options for mechanically loadable insulations in honeycomb bodies.

The configuration described above having a smaller honeycomb body and a larger honeycomb body, with the smaller honeycomb body disposed upstream of the larger honeycomb body in the exhaust system, is also advantageous even if separate heating is not provided for. The smaller honeycomb body intrinsically has a lower thermal capacity than the larger honeycomb body and therefore warms up relatively quickly if a hot fluid, such as exhaust gas, flows through it. Therefore, in the smaller honeycomb body, a catalyzed reaction also comes rapidly into play and with the heat released reinforces the heating of the larger honeycomb body.

Both considerations regarding electrically heating the smaller honeycomb body and considerations regarding how to dimension its thermal capacity lead to keeping the mass of the smaller honeycomb body small, but naturally with the secondary condition that the smaller honeycomb body, after the activation of the catalyst located on it, furnishes adequate heating of the fluid flowing through it and reinforces the heating of the larger honeycomb body. Even in view of that secondary condition, those considerations may possibly contradict the requirements for mechanical stability of the smaller honeycomb body: particularly in a motor vehicle exhaust system, severe pulsation occurs, and the honeycomb bodies are exposed to considerable mechanical strains, which is why stringent requirements must be made of them in terms of strength.

SUMMARY OF THE INVENTION

It is accordingly an object of the invention to provide a honeycomb body with a plurality of disks braced against one another, which overcomes the hereinafore-mentioned disadvantages of the heretofore-known devices of this general type, in which the options for configurations with a plurality of honeycomb bodies can be made full use of and yet in which especially the aforementioned problems regarding strength do not arise. In particular, substantially greater freedom in construction should be achieved, especially in view of optimizing the warmup performance with or without electrical heating.

With the foregoing and other objects in view there is provided, in accordance with the invention, a metal honeycomb body, comprising at least two disks being mutually spaced apart and disposed one after the other relative to an axis; each of the disks having a multiplicity of channels formed therein through which a fluid can flow along the axis; and at least one support connecting the disks to one another in the vicinity of the axis, the at least one support having a tubular or bar-like shape.

According to the invention, the disks of the honeycomb body are braced against one another by means of at least one support disposed near the axis, or a configuration of a plurality of such supports. The connection of the disks with one another is capable of increasing the mechanical loadability of the honeycomb body substantially, since the disks of the honeycomb body cooperatively intercept mechanical strains.

In accordance with another feature of the invention, the honeycomb body is approximately axially symmetrical with respect to the axis, and in particular rotationally symmetrical, and each disk is defined by two end surfaces aligned approximately perpendicular to the axis. These provisions, either individually or in combination, contribute to an economic manufacture and recycling of the honeycomb body.

In accordance with a further feature of the invention, the disks include a first disk and a second disk in the honeycomb body; the first disk parallel to the axis has a thickness that is less, and preferably substantially less, than the thickness, defined parallel to the axis, of the second disk.

In accordance with an added feature of the invention, the first disk is braced by the second disk through the at least one support, so that the first disk can be constructed solely with a view toward low thermal capacity and an electrical resistance of a predetermined magnitude, as much as possible; the overall mechanical strength required can be assured substantially by the second disk, which supports the first disk through the at least one support.

In accordance with an additional feature of the invention, the disks include an at least partially electrically conductive first disk, in which a current path is formed for passing an electric current through for heating, and which is braced against a second disk through at least one electrically insulating support. In the context of this further feature, use is also made of the fact that the mechanical strength of the honeycomb body may be determined by one of a plurality of disks, while other disks can be constructed for other tasks, without taking special strength requirements into account. For instance, it is possible for a first disk to be largely adapted to the requirements for electrical heating, and to assure its strength by bracing it against a second disk that determines the mechanical strength, for instance by means of insulating supports that, for instance, are ceramic or contain ceramic components.

In accordance with yet another feature of the invention, the disks include two disks, each of which is at least partially electrically conductive and which are braced against one another through at least one electrically conductive support, at least one current path is formed for passing an electric current through it for the sake of heating, and both the disks and the support are incorporated into this current path. In the context of this feature, the electrically conductive support is utilized in order to conduct the electric current from one disk to another disk. This affords an option of delivering electrical current to the honeycomb body at a jacket surface surrounding a first disk, and to tap this current again at a jacket surface surrounding a second disk. Thus, in a honeycomb body that is electrically heatable directly, an electric terminal in the region near the axis may be superfluous. It is also possible to dispense with mutually electrically insulated subdivisions of the jacket surface, since constructing the jacket surface sufficiently sturdily in mechanical terms may already be problematic. According to the invention, an electrically heatable honeycomb body that has an electrical resistance with a magnitude of the kind that is desirable and advantageous in motor vehicles, can be furnished with very simple means.

An "at least partially" electrically conductive disk is understood to be a disk that is electrically conductive to a sufficient extent, but into which insulators and/or gaps may optionally be introduced, for instance for the sake of adjusting the electrical resistance to a predetermined magnitude.

In accordance with yet a further feature of the invention, the channels located in the disks have different mean cross-sectional areas, from one disk to another. For instance, in a first, thinner disk, there are channels with larger cross-sectional areas than the cross-sectional areas of the channels in a second, thicker disk. Large cross-sectional areas of the channels result in a low thermal capacity, since less material is needed to form the disk and since there is also limited effectiveness of a catalyst located in the channels. A disk with channels of relatively large cross section is therefore especially well-suited for disposition upstream of another disk that is constructed for high effectiveness by means of channels of a small cross section and sufficiently great length. The reduced effectiveness of the catalyst in the disk having the large cross-sectional areas assures reduced wear, which contributes substantially to lengthening catalyst life. Especially if a first, smaller disk is to reinforce the heating of a second, larger disk, premature wear of the catalyst located on the first disk is extremely undesirable, because the additional heating of the second disk decreases directly with this wear. The freedom of construction achieved with the invention makes it possible in particular to limit the catalytic effectiveness in a smaller disk, which is located upstream of a larger disk, so that in the smaller disk, no more than approximately one-fourth of the convertable ingredients contained in a fluid flowing through it is converted. This makes it possible to assure the long-term effectiveness of the catalyst.

A plurality of options exist for constructing the support in the honeycomb body.

In accordance with yet an added feature of the invention, there is provided a single support which is disposed in such a way that it is penetrated by the axis of the honeycomb body.

Alternatively, in accordance with yet an additional feature of the invention, there is provided a plurality of supports in the honeycomb body, which are disposed approximately symmetrically with respect to the axis.

A support in the honeycomb body may in turn be a honeycomb body. In other words, channels as in other components of the honeycomb body may also be located in the support itself.

In accordance with again another feature of the invention, the multipart structure of the honeycomb body is determined by a groove encompassing the axis. The support is then a part of the honeycomb body bounded by the groove, and each disk is a part of the honeycomb body remote from the groove. Such a groove may already be formed when a metal honeycomb body is produced, by using sheet-metal layers with suitable slits. The groove can also be made by later machining in a honeycomb body that is originally one piece. Later machining of this kind may, for instance, be a turning or milling process.

In accordance with again a further feature of the invention, each disk has at least one stack, wound in the manner of a spiral, with at least one sheet-metal layer, and in particular with at least two differently structured sheet-metal layers, preferably with at least one smooth sheet-metal layer and at least one corrugated sheet-metal layer. Aside from the advantages of the metal structure, which are apparent from the prior art references cited, a honeycomb body formed of sheet-metal layers also makes it easy to achieve the special embodiments already described above. In particular, the segments of the honeycomb body may be dimensioned differently. For instance, channels having cross-sectional areas which deviate from one another may be formed in various segments. Additionally, a metal honeycomb body may be obtained by simple post-machining of a metal honeycomb body that was originally in one piece.

The at least one support, in a honeycomb body with metal segments, is advantageously also formed substantially of metal. The support may be a simple metal rod, a metal tube, or a special honeycomb body wound from at least one, optionally structured, sheet-metal layer.

In accordance with again an added feature of the invention, the support is incorporated into the structure of each disk. In particular, each disk has at least one stack including at least one sheet-metal layer and being folded and/or wound around the support.

In accordance with again an additional feature of the invention, the stack is wound in an S-shape, in a manner known per se, around two spaced-apart supports.

In accordance with still another feature of the invention, there are provided at least two spaced-apart supports, each support being assigned one stack folded around it, and all of the stacks being wound around the supports in the manner of a spiral.

In accordance with still a further feature of the invention, there is provided at least one current path formed in the honeycomb body for passing an electrical current through the honeycomb body. As already mentioned, a metal honeycomb body is also especially suitable for direct electrical heating in this way.

In accordance with still an added feature of the invention, at least one support is electrically conductive, and each disk has an approximately axially aligned jacket surface, and a terminal on each jacket surface for supplying and/or drawing-off an electrical current, each terminal and the electrically conductive support are located in the current path. Thus a honeycomb body with two disks has one terminal on each jacket surface, the electric current flows in one of the disks from the terminal in the jacket surface to the support, through the support into the other disk, and there from the support to the jacket surface, where it is drawn off at the terminal located there. In this way, the invention permits the formation of an electrically heatable honeycomb body, in which no terminals in the interior, and in particular in the vicinity of the axis, are necessary. The invention accordingly enables substantial simplification of current supply to an electrically heatable honeycomb body, and makes it possible to dispense with current supply leads, which must extend into regions near the axis of the honeycomb body, that may possibly be objectionable.

In accordance with still an additional feature of the invention, besides an electrically conductive support, there is provided an electrically insulating support in the honeycomb body, which may be a rod or the like of a ceramic composition, and metal-ceramic composite materials may also be used. A ceramically coated metal rod may possibly be used as the metal-ceramic composite material. Optionally, the ceramic layer may partly have a metal sheath, while maintaining insulation. This kind of metal rod with a ceramic coating and a metal sheath may also serve to form a complicated current path in a honeycomb body according to the invention having three or more disks, and this may be advantageous in the context of specialized applications, in some circumstances. An electrically insulated support may also be an insulated layer protruding from one disk of the honeycomb body into another disk and in each disk insulating two stacks from one another. In this way, a particularly sturdy honeycomb body is formed.

In accordance with another feature of the invention, at least one disk of an electrically conductive honeycomb body includes at least two stacks, which are electrically insulated against one another, and each of which is folded and wound around one electrically conductive support located in the current path. In this way, the two stacks can be connected electrically in series, which is useful to increase the electrical resistance of the honeycomb body. Connecting the two stacks in series can be accomplished through the supports, which can be brought into electrical connection with one another through a further disk of the honeycomb body, in or on which the supports are secured. In the simplest case, this is accomplished by not having any insulation layers at all in the second disk. However, it is also possible to form the second disk like the first from mutually insulated stacks folded and wound around the electrically conductive supports, and to provide electrical connections, each of which connects two stacks with one another, in the jacket surface of the second disk. In this way, all of the stacks, all of the electrically conductive supports, and all of the electric connections in the jacket surfaces can be connected electrically in series, and the honeycomb body can be connected to an electrical voltage source at two corresponding terminals.

In accordance with a concomitant feature of the invention, a ceramic insulation layer, for instance a mat or the like formed of ceramic fibers, is especially appropriate as the insulation layer in a honeycomb body. Spaced-apart ceramic spacers, which assure air gaps between two stacks in a disk, are also conceivable.

Other features which are considered as characteristic for the invention are set forth in the appended claims.

Although the invention is illustrated and described herein as embodied in a honeycomb body with a plurality of disks braced against one another, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED DRAWINGS

Figure 1:
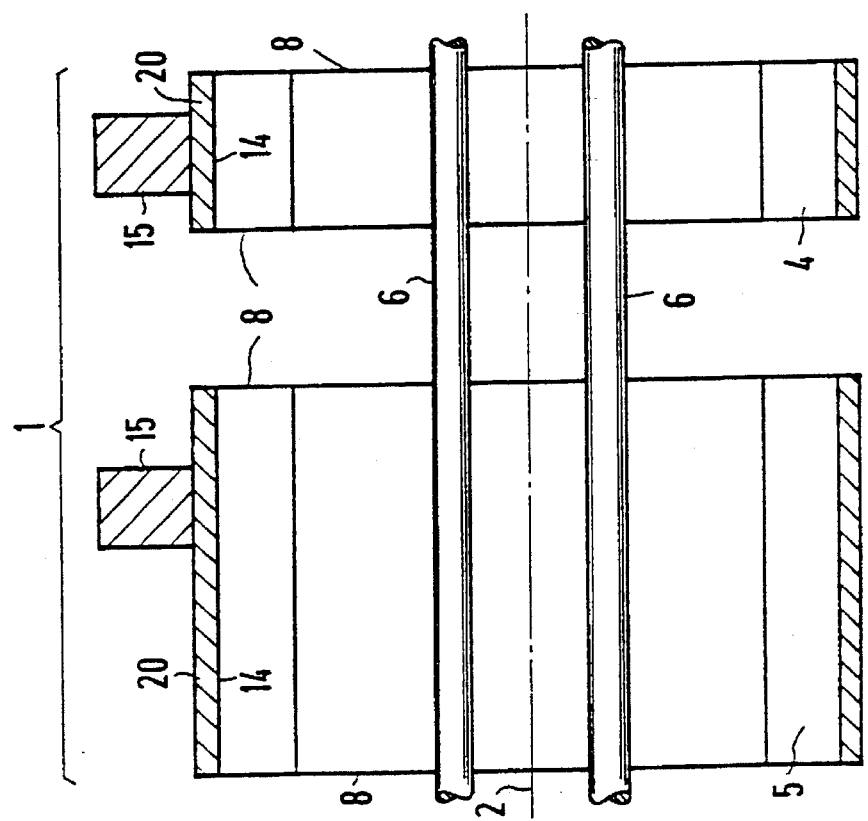
FIG. 1 is a fragmentary, diagrammatic, longitudinal-sectional view of a honeycomb body according to the invention.

Referring now in detail to the figures of the drawing, which are partly diagrammatic and/or slightly distorted to add clarity, and first, particularly, to FIG. 1 thereof, there is seen a honeycomb body 1 formed of a first disk 4, a second disk 5 and two tubular or bar or rod-like supports 6 that join the first disk 4 and the second disk 5 to one another. The honeycomb body 1 has an axis 2 and is constructed as rotationally symmetrically as possible with respect to the axis. Each disk 4, 5 is defined by an axially oriented jacket surface 14 and two end surfaces 8 oriented perpendicular to the axis 2. Each disk 4, 5 is inserted into one jacket tube 20. One terminal 15 is located on each jacket tube 20. Through the use of the terminals 15, an electric current for heating the honeycomb body 1 can be passed through the honeycomb body 1, which is electrically conductive by virtue of it being made of metal, for instance. Electric heating takes place primarily in the first disk 4, because it is thinner than the second disk 5 and accordingly has a markedly higher electrical resistance. In an exhaust system of an internal combustion engine, the honeycomb body 1 is advantageously disposed in such a way that exhaust gas coming from the engine flows first through the first disk 4 and then through the second disk 5. A catalyst in the first disk 4 can be activated very quickly by the electric heating and thus by heating the exhaust gas flowing out to the second disk 5, it contributes to the accelerated heating of the second disk 5.

Figure 2:
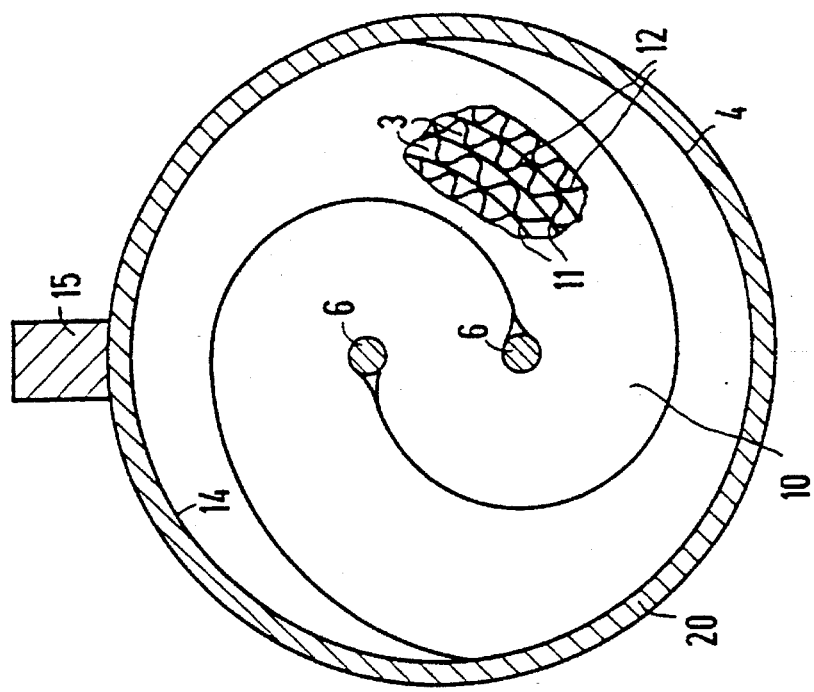
FIG. 2 is a cross-sectional view of one disk of the honeycomb body shown in FIG. 1.

FIG. 2 shows a cross section through the first disk 4 of the honeycomb body 1 shown in FIG. 1. The first disk 4 includes a stack 10 which is layered of smooth sheet-metal layers 11 and corrugated sheet-metal layers 12 and which is entwined in the form of an S around the two supports 6. Channels 3 are formed by the smooth sheet-metal layers 11 and corrugated sheet-metal layers 12, so that exhaust gas or some other fluid with catalytically convertible ingredients can flow through these channels. Each smooth sheet-metal layer 11 and each corrugated sheet-metal layer 12 terminates at the jacket surface 14, where it is joined to the jacket tube 20, in particular by hard soldering or brazing. The terminal 15 serves to supply or draw an electrical current, the current passes through the first disk 4 to or from the supports 6, and the supports 6 carry the electric current on to another disk of the honeycomb body.

Figure 3:
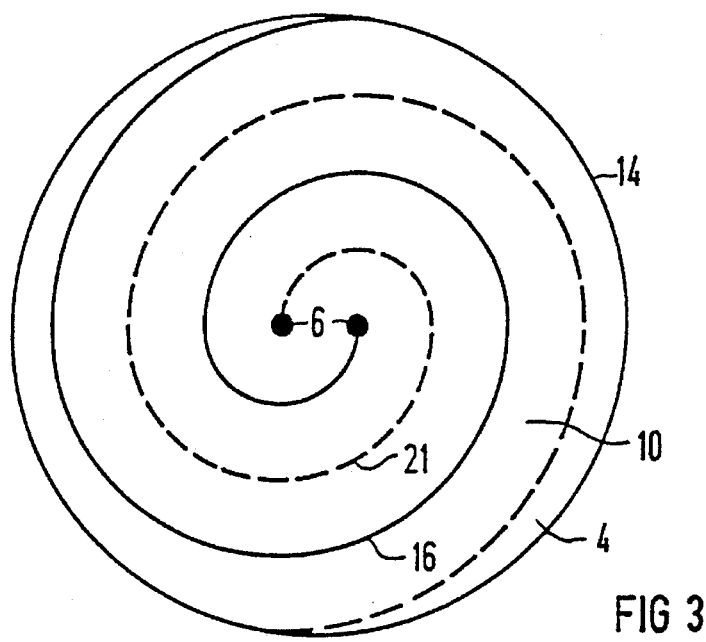
FIG. 3 is a cross-sectional view of a special embodiment of a disk.

FIG. 3 shows a variant of the first disk 4 shown in FIG. 2, in a highly diagrammatic and in simplified form, which in this case is formed of a stack 10 being intertwined in an S. In FIG. 3, an insulation layer 16 is provided in the disk 4 which prevents a radially oriented flow of current from the jacket surface 14 to the supports 6 and thus increases the effective electrical resistance of the disk 4. Beginning at one of the supports 6, the insulation layer 16 is inserted between overlying turns of the stack 10. Beginning at the other support 6, a dividing line 21 between overlying turns of the stack 10 is shown. It is not necessary as a rule to provide insulation layers 16 beginning at both supports, but this option is not precluded either.

Figure 4:
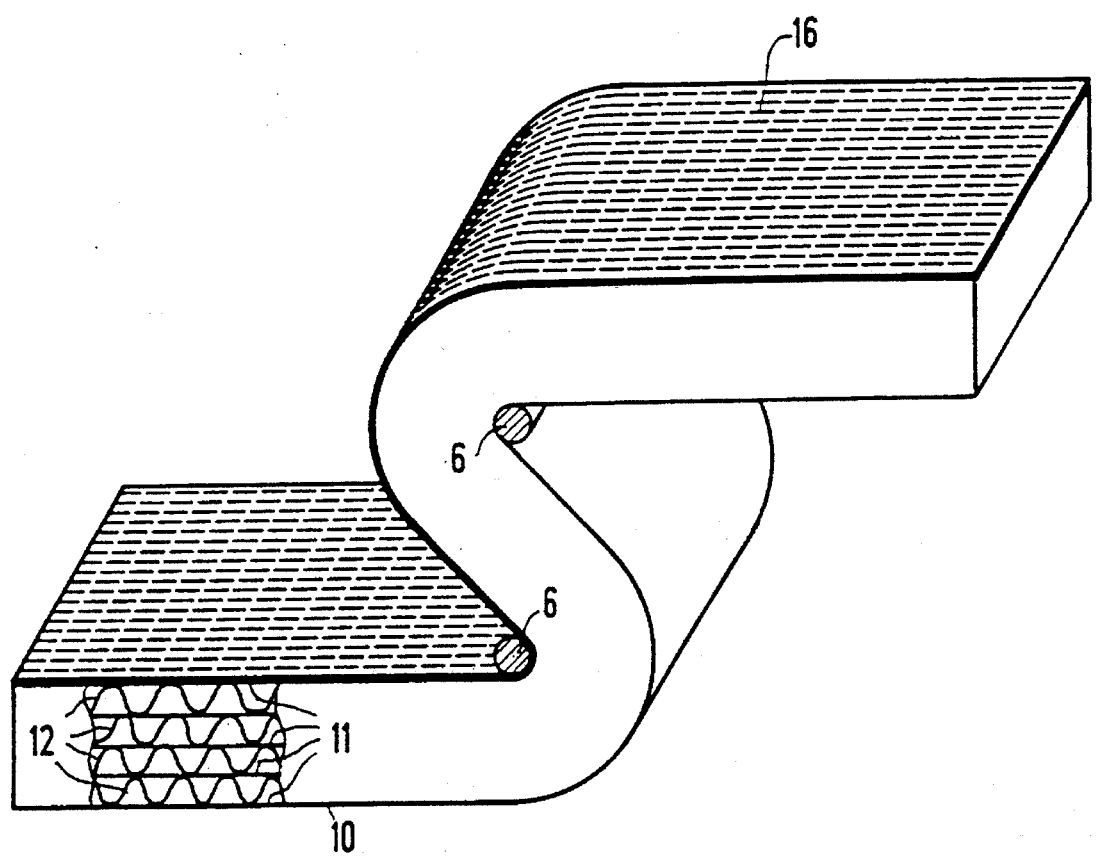
FIG. 4 is an enlarged, perspective view illustrating the formation of the disk shown in FIG. 3.

FIG. 4 demonstrates how a disk shown in FIG. 3 can be formed by S-like intertwining of the stack 10 of smooth sheet-metal layers 11 and corrugated sheet-metal layers 12. The stack 10 is engaged between two supports 6 and wound around these supports 6. The insulation layer 16 can be seen on the stack 10. The insulation layer 16 may be a ceramic coating of one sheet-metal layer 11 of the stack 10, or it may be a ceramic fiber mat or the like placed on the stack 10.

Figure 5:
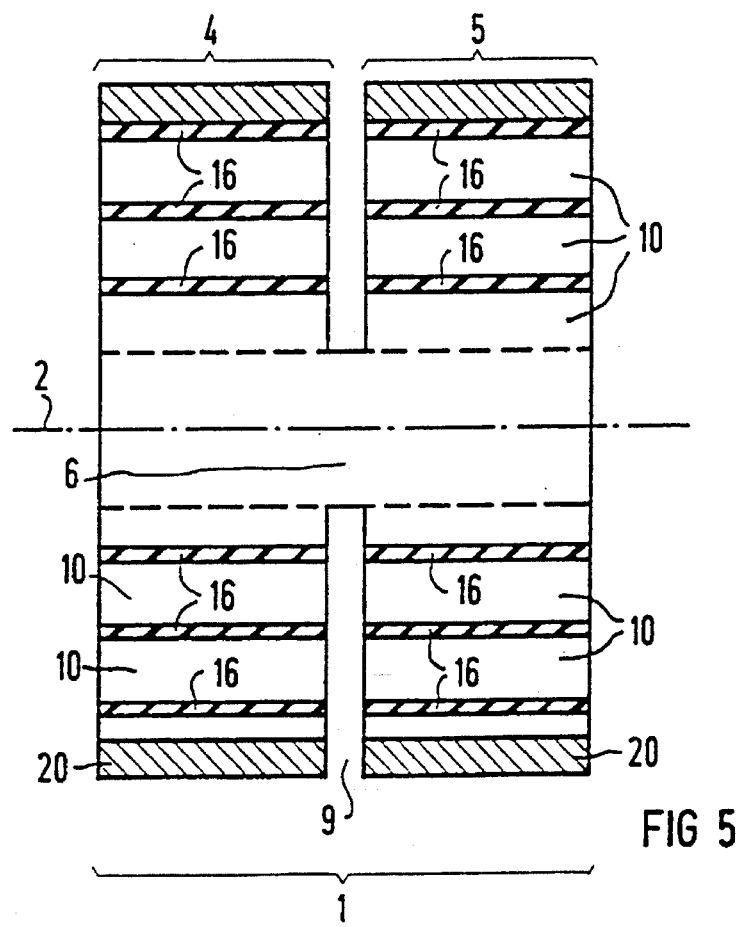
FIG. 5 is a longitudinal-sectional view of a further embodiment of the honeycomb body of the invention.

FIG. 5 shows a longitudinal section through a honeycomb body 1 in accordance with another embodiment of the invention. The two disks 4, 5 of the honeycomb body 1 are divided from one another by a groove 9, which is formed approximately perpendicular to the axis 2 in the honeycomb body 1. The honeycomb body 1 is formed by intertwining the stack 10, with the interposition of the insulation layer 16, as is shown in FIGS. 2 and 3. The groove 9 may be made retroactively in the honeycomb body 1 and in the jacket tube 20 that surrounds the honeycomb body 1. The support 6 is intended to be a region of the honeycomb body 1 that is bounded by the groove 9. The disks 4 and 5 form sidewalls of the groove 9.

Figure 7:
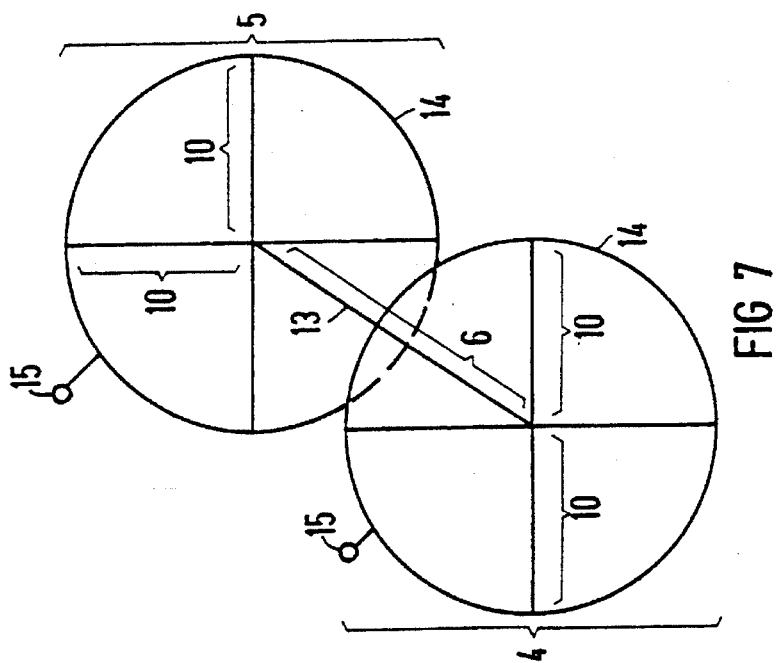
FIG. 7 is perspective view showing a different embodiment of the current path.
Figure 6:
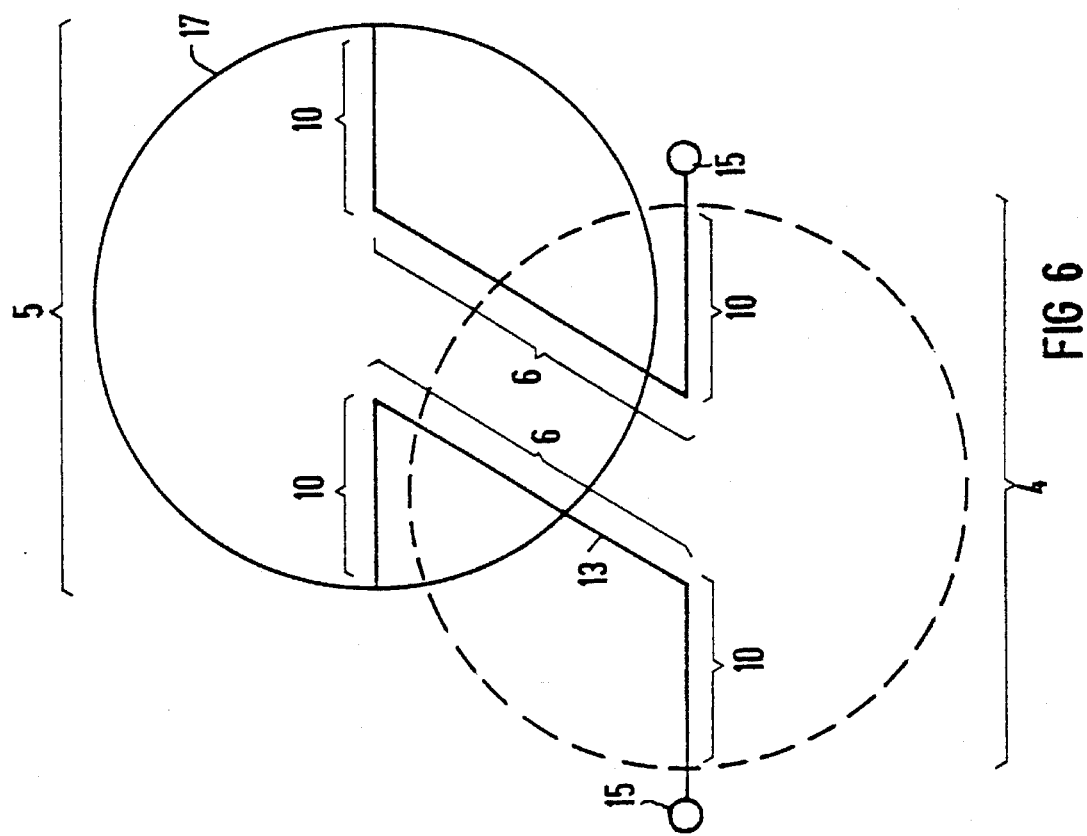
FIG. 6 is perspective view showing the current path in a honeycomb body.

FIGS. 6 and 7 highly diagrammatically show the course of a current path 13 that an electric current takes through a honeycomb body according to the invention. In each case, two disks 4 and 5 are suggested. In each disk 4, 5, the current path 13 leads from a jacket surface 14 to an electrically conductive support 6, through this support 6 into the other disk of the pair 4, 5, and from there back to the jacket surface 14 through at least one stack 10. In FIG. 6, the supplying and drawing of the electric current takes place at the terminals 15, both of which are disposed on the first disk 4. The second disk 5 serves primarily to establish a connection between the two supports 6. In the example shown, this connection is made through the stack 10 in the second disk 5 and through an electrical connection 17, which may be conceived of as being in the jacket surface 14 of the second disk 5. Such a connection 17 may be a metal jacket tube, which under some circumstances may have to be insulated against other components of the exhaust system in which the honeycomb body is located. In FIG. 6, heating of both the first disk 4 and the second disk 5 can be achieved. If heating of the second disk 5 is not desired, then the connection in the second disk 5 between the two supports 6 may be formed by the entire disk 5, if no insulation layers are present there. Then, under some circumstances, a separate electrical connection 17 may be omitted. In FIG. 7, the electric current of the first disk 4 is delivered to a terminal 15, it travels from the jacket surface 14 through the stack 10 and the support 6 to the second disk 5, passes through the stack 10 in the second disk 5, and is picked up again on the jacket surface 14 of the second disk 5 at a terminal 15. FIG. 7 accordingly shows the simplest possibility for forming a current path 13 in a honeycomb body according to the invention. This option is also realized in FIG. 1 (although in that instance, two electrically parallel-connected supports 6 are provided).

Figure 8:
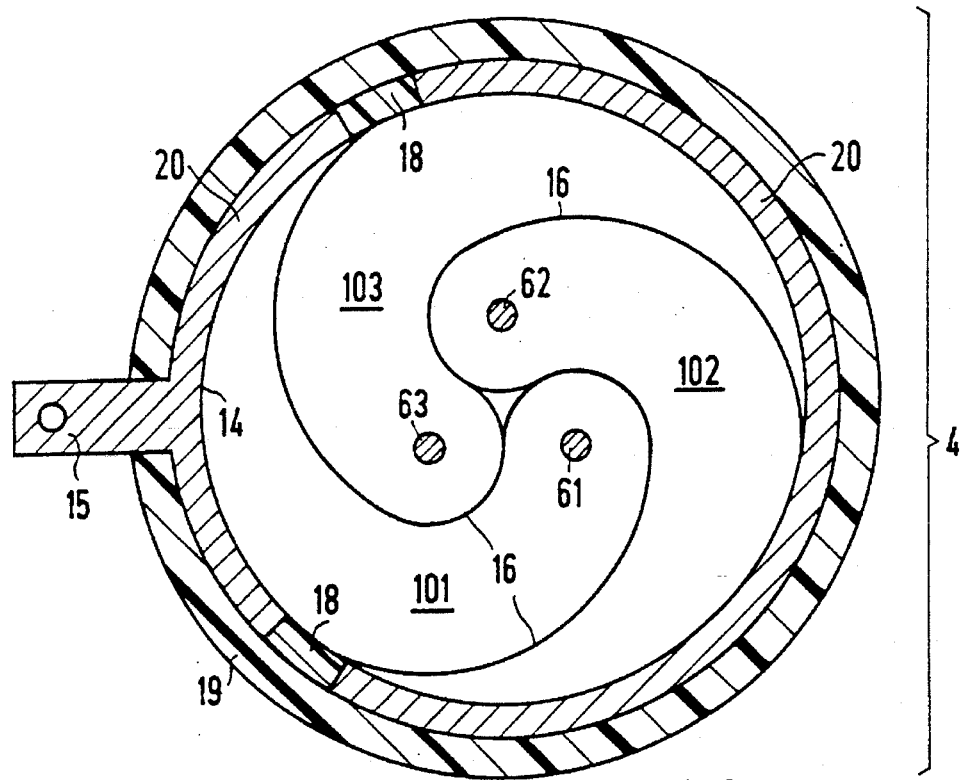
FIG. 8 is a cross-sectional view of a special embodiment of a disk.

FIG. 8 shows a disk 4 of a honeycomb body, with three stacks 101, 102, 103, each of which is folded around a respective support 61, 62 and 63 and which are intertwined in the manner of an involute around the three supports 61, 62, 63. The three stacks 101, 102 and 103 are insulated from one another by insulation layers 16. The configuration of stacks 101, 102, 103 is located in a metal jacket tube 20 which, however, is not complete but instead has two insulating pieces 18 inserted into it in such a way that through the jacket tube 20, two stacks 102 and 103 are connected to one another but are separated from the third stack 101. The part of the jacket tube 20 connected to the stack 101 has a terminal 15, through which an electric current can, for instance, be delivered. The disk 4 is connected to an identical non-illustrated second disk. The electric current is carried as follows: the current is fed in at the terminal 15 and it flows into the stack 101 and from there through the support 61 into the second disk. In the second disk, which must likewise be subdivided by insulation layers, the current flows from the stack 103, to the support 62 and it passes through the support 62 and thus reaches the stack 102. From that stack, it passes through the connection provided by the jacket tube 20 into the stack 103 and from there into the support 63 of the first disk. Through this support 63, it flows back to the second disk, where it should be drawn at a further terminal. In fact, the three stacks 101, 102 and 103 are thus electrically connected in series, resulting in a relatively high electrical resistance. This kind of high electrical resistance is wellknown to be advantageous for heating purposes.

Figure 9:
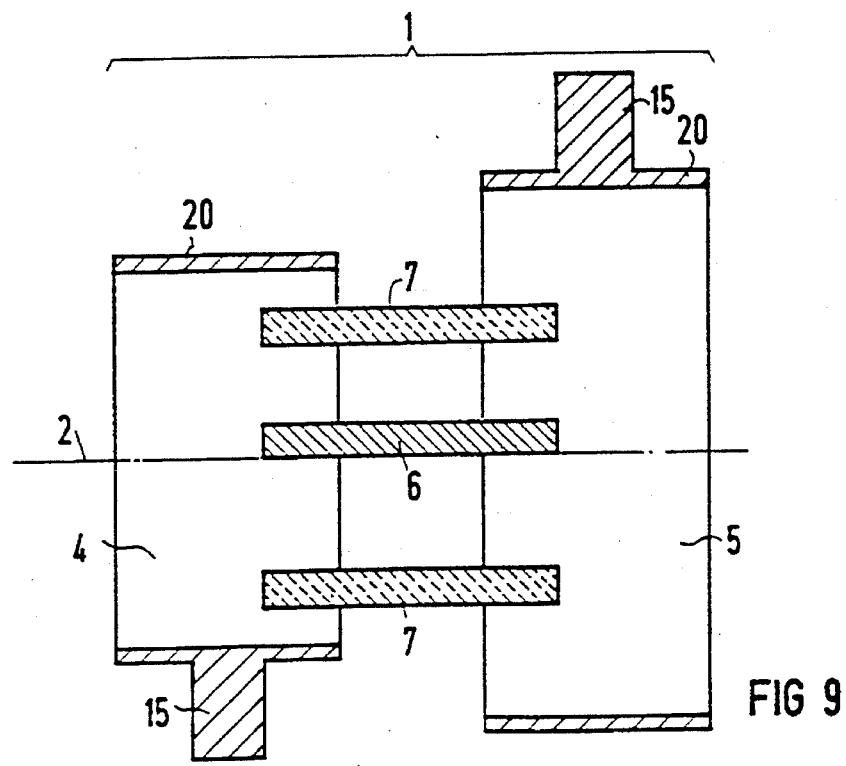
FIG. 9 is a longitudinal-sectional view of a further embodiment of the honeycomb body.

FIG. 9 shows a further exemplary embodiment of the honeycomb body 1 of the invention. The honeycomb body 1 has two disks 4 and 5, which are disposed one after the other with respect to the axis 2. Both disks 4 and 5 should be formed of sheet-metal layers or electrically conductive ceramic. In order to join the disks 4 and 5 to one another, an electrically conductive support 6 and two electrically insulating supports 7 are provided. All of the supports 6, 7 are joined to the disks 4 an 5, for instance by hard soldering or brazing. Each disk 4, 5 is enclosed in a jacket tube 20, and each jacket tube 20 has one terminal 15 for supplying or drawing off an electric current.

Figure 11:
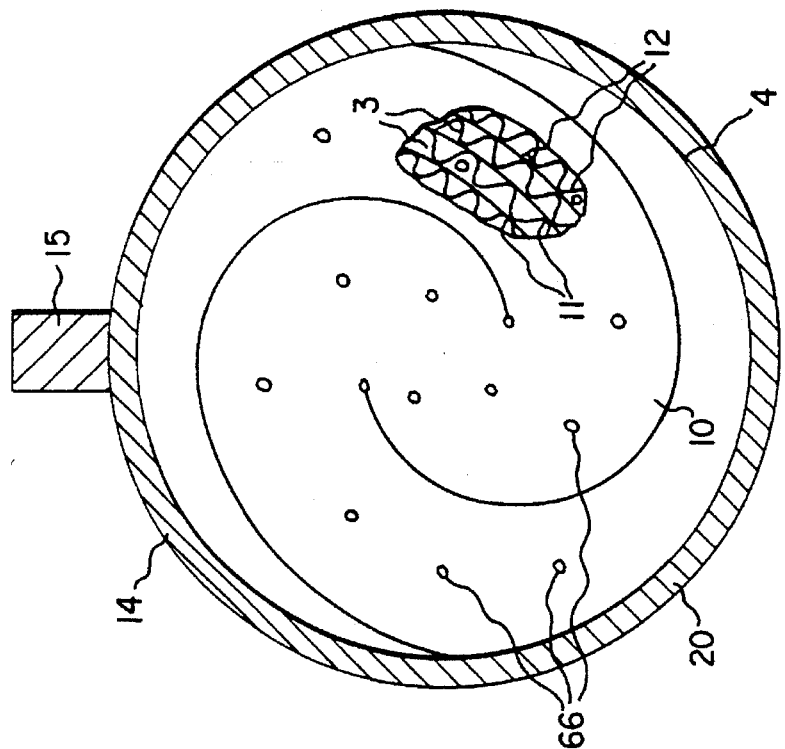
FIGS. 10 and 11 are views similar to FIGS. 1 and 2 of another embodiment of the invention.
Figure 10:
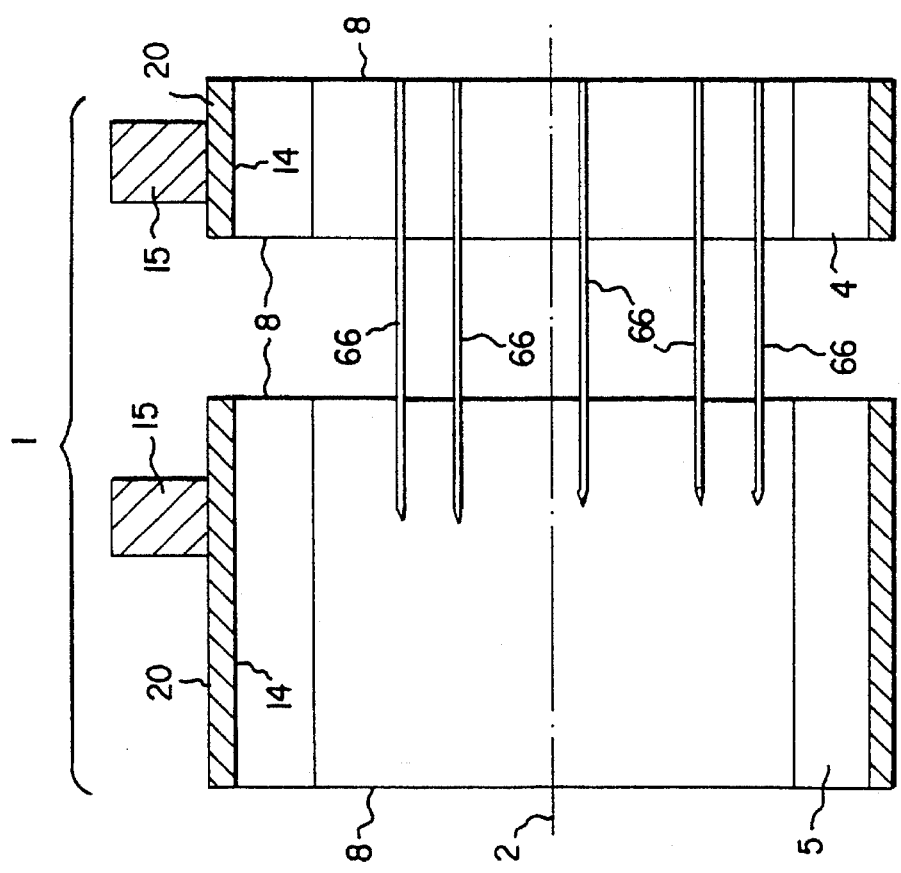

In the embodiment of FIGS. 10 and 11, approximately thirty electrically insulated pins 66 are distributed over the end surface for connecting adjacent disks to each other.

The invention relates to a honeycomb body through which a fluid can flow along an axis, in which the fluid flows through a multiplicity of channels in the honeycomb body. The honeycomb body has at least two disks, which are spaced apart from one another, are disposed one after the other with respect to the axis and each of which has channels. According to the invention, at least one support is provided near the axis, by means of which the disks are connected to one another and braced against one another. The invention makes it possible to construct a first disk with a view toward rapid heatability by exhaust gas flowing through it or by electric current passing through it, and/or to assure the mechanical strength of the honeycomb body substantially by suitable construction of the second disk and of the support. The honeycomb body of the invention is especially suitable for use as a carrier for a catalyst in the exhaust gas system of an internal combustion engine, for instance in a motor vehicle.

We claim:

1. A metal honeycomb body through which a fluid can flow in a direction along an axis thereof, comprising:

a) first and second honeycomb disks defining a space therebetween and being disposed one after the other relative to an axis along which a fluid can flow through the honeycomb disks, each of said disks having two end surfaces aligned approximately perpendicular to the axis;

b) each of said disks having a multiplicity of channels formed therein through which the fluid can flow along the axis; and c) at least one support extending axially across said space and connecting said disks to one another, said at least one support being selected from the group consisting of tubular, bar-shaped and rod-shaped supports;

wherein said first disk is at least partially electrically conductive, said first disk defies a current path therein for the passage through said first disk of an electric current for heating, and said at least one support includes at least one electrically insulating support through which said first disk is braced against said second disk.

2. The honeycomb body according to claim 1, wherein said disks are approximately radially symmetrical relative to the axis.

3. The honeycomb body according to claim 1, wherein said disks are rotationally symmetrical about the axis.

4. The honeycomb body according to claim 1, wherein said each of said disks has a thickness in a direction parallel to the axis, and the thickness of said second disk is greater than the thickness of said first disk.

5. The honeycomb body according to claim 1, wherein said at least one support has a cross section, and the axis is defined inside the cross section of the at least one support.

6. The honeycomb body according to claim 1, wherein said at least one support is a plurality of supports disposed approximately symmetrically relative to the axis.

7. The honeycomb body according to claim 1, wherein each of said disks has at least one stack wound in the form of a spiral, and each of said stacks has at least one sheet-metal layer.

8. The honeycomb body according to claim 7, wherein each of said stacks has at least two differently structured sheet-metal layers.

9. The honeycomb body according to claim 8, wherein said at least two differently structured sheet-metal layers include at least one smooth sheet-metal layer and at least one corrugated sheet-metal layer.

10. The honeycomb body according to claim 7, wherein said at least one stack of each of said disks is formed around said at least one support.

11. The honeycomb body according to claim 7, wherein said at least one support is at least two mutually spaced-apart supports, and said at least one stack of each of said disks is wound in an S shape around said supports.

12. The honeycomb body according to claim 7, wherein said at least one support is at least two mutually spaced-apart supports, and in each of said disks each of said stacks is formed around a respective one of said supports, and all of said stacks are wound in the form of a spiral.

13. The honeycomb body according to claim 7, further including an electrically conductive support located in the current path, and wherein at least one of said disks includes at least two of said stacks being electrically insulated against one another, and each of said stacks is formed around said electrically conductive support and wound together with other stacks.

14. The honeycomb body according to claim 13, including at least one insulation layer insulating said stacks from one another.

15. The honeycomb body according to claim 14, wherein said at least one insulation layer is a ceramic insulation layer.

16. The honeycomb body according to claim 7, further including at least two electrically conductive supports, and wherein:
   a) each of said disks has at least two of said stacks being electrically insulated against one another, and each of said stacks is formed around a respective one of said electrically conductive supports;
   b) each of said electrically conductive supports connects one of said stacks in said first disk to one of said stacks in said second disk;
   c) each of said disks has an approximately axially aligned jacket surface bordering said disk and at least one electrical connection in said jacket surface between two of said stacks; and
   d) all of said stacks, all of said electrically conductive supports, and all of said electrical connections are electrically connected in series.

17. The honeycomb body according to claim 1, further including at least one electrically conductive support between said disks, and said at least one electrically conductive support is disposed in said current path.

18. The honeycomb body according to claim 17, wherein:
   a) each of said disks has an approximately axially aligned jacket surface bordering said disk; and
   b) each of said jacket surfaces has a respective terminal for supplying and/or drawing-off an electrical current.

19. The honeycomb body according to claim 1, wherein the axis of the honeycomb disks is defined at a center thereof, and said at least one support includes at least one support disposed in the vicinity of the axis.

20. The honeycomb body according to claim 1, wherein said at least one support includes a multiplicity of supports.

21. The honeycomb body according to claim 20, wherein said supports are statistically distributed to prevent all parts of said disks form vibrating.

22. The honeycomb body according to claim 20, wherein said supports are pins distributed over an end surface of one of said disks.

23. The honeycomb body according to claim 1, wherein, said second disk is disposed behind said first disk as seen in a flow direction of the fluid, said first disk having a smaller heat capacity than said second disk.

24. A metal honeycomb body through which a fluid can flow in a direction along an axis thereof, comprising:
   a) first and second honeycomb disks defining a space therebetween and being disposed one after the other relative to an axis along which a fluid can flow through the honeycomb disks, each of said first and second disks having two end surfaces aligned approximately perpendicular to the axis;
   b) each of said first and second disks having a multiplicity of channels formed therein through which the fluid can flow along the axis; and
   c) at least one support extending axially across said space and connecting said disks to one another, said at least one support being selected from the group consisting of tubular, bar-shaped and rod-shaped supports;
wherein:
   said channels of each of said disks have cross-sectional areas being perpendicular to the axis and having a given mean value;
   each of said disks has a mean cross-sectional area corresponding to the given mean value; and the mean cross-sectional area of said first disk is greater than the mean cross-sectional area of said second disk.

25. The honeycomb body according to claim 24, wherein said disks are approximately radially symmetrical relative to the axis.

26. The honeycomb body according to claim 24, wherein said disks are rotationally symmetrical about the axis.

27. The honeycomb body according to claim 24, wherein each of said disks has a thickness in a direction parallel to the axis, and the thickness of said second disk is greater than the thickness of said first disk.

28. The honeycomb body according to claim 24, wherein said at least one support includes at least one electrically conductive support bracing said two disks against one another, each of said two disks is at least partially electrically conductive and defines at least one current path for passing an electric current through the honeycomb body for heating, said two disks and said at least one support being partially incorporated into said current path.

29. The honeycomb body according to claim 24, wherein said support has a cross section and the axis is defined inside the cross section.

30. The honeycomb body according to claim 24, wherein said at least one support is a plurality of supports disposed approximately symmetrically relative to the axis.

31. The honeycomb body according to claim 24, wherein each of said disks has at least one stack wound in the form of a spiral, and each of said stacks has at least one sheet-metal layer.

32. The honeycomb body according to claim 31, wherein each of said stacks has at least two differently structured sheet-metal layers.

33. The honeycomb body according to claim 32, wherein said at least two differently structured sheet-metal layers include at least one smooth sheet-metal layer and at least one corrugated sheet-metal layer.

34. The honeycomb body according to claim 31, wherein said at least one stack of each of said disks is formed around said at least one support.

35. The honeycomb body according to claim 31, wherein said at least one support is at least two mutually spaced-apart supports, and said at least one stack of each of said disks is wound in an S shape around said supports.

36. The honeycomb body according to claim 31, wherein said at least one support is at least two mutually spaced-apart supports, and in each of said disks each of said stacks is formed around a respective one of said supports, and all of said stacks are wound in the form of a spiral.

37. The honeycomb body according to claim 31, including at least one current path defined through the honeycomb disks for passing an electric current through the honeycomb disks for heating the honeycomb disks.

38. The honeycomb body according to claim 37, wherein:
   a) each of said disks has an approximately axially aligned jacket surface bordering said disk;
   b) said at least one support is electrically conductive;
   c) each of said jacket surfaces has a respective terminal for supplying and/or drawing-off, an electrical current; and
   d) each of said terminals and said at least one electrically conductive support are disposed in said at least one current path.

39. The honeycomb body according to claim 37, wherein said at least one support includes at least one electrically conductive support and at least one electrically insulating support between said disks, and said at least one electrically conductive support lie disposed in said current path.

40. The honeycomb body according to claim 31, wherein at least one of said disks includes at least two of said stacks being electrically insulated against one another, said at least one support includes an electrically conductive support located in a current paths, and each of said stacks is formed around said electrically conductive support.

41. The honeycomb body according to claim 40, including at least one insulation layer insulating said stacks from one another.

42. The honeycomb body according to claim 41, wherein said at least one insulation layer is a ceramic insulation layer.

43. The honeycomb body according to claim 31, wherein:
   a) each of said disks has at least two of said stacks being electrically insulated against one another, said at least one support includes at least two electrically conductive supports, and each of said stacks is formed around a respective one of said electrically conductive supports;
   b) each of said electrically conductive supports connects one of said stacks in said first disk to one of said stacks in said second disk;
   c) each of said disks has an approximately axially aligned jacket surface bordering said disk and at least one electrical connection in said jacket surface between two of said stacks; and
   d) all of said stacks, all of said electrically conductive supports, and all of said electrical connections are electrically connected in series.

44. The honeycomb body according to claim 24, wherein the axis of the honeycomb disk is defined at a center thereof and said at least one support includes at least one support disposed in the vicinity of the axis.

45. The honeycomb body according to claim 24, wherein said at least one support includes a multiplicity of supports.

46. The honeycomb body according to claim 45, wherein said supports are statistically distributed to prevent all parts of said disks from vibrating.

47. The honeycomb body according to claim 45, wherein said supports are pins distributed over an end surface of one of said disks.

48. The honeycomb body according to claim 24, wherein said second disk is disposed behind said first disk as seen in a flow direction of the fluid, said first disk having a smaller heat capacity than said second disk.

* * * * *